United States Patent [19]

Rebeyrolle et al.

[11] Patent Number: 5,832,050
[45] Date of Patent: Nov. 3, 1998

[54] ZIRCONIUM-BASED ALLOY, MANUFACTURING PROCESS, AND USE IN A NUCLEAR REACTOR

[75] Inventors: Veronique Rebeyrolle, Saverges; Daniel Charquet, Albertville, both of France

[73] Assignee: Compagnie Europeene du Zirconium Cezus, Courbevoie, France

[21] Appl. No.: 843,531

[22] Filed: Apr. 16, 1997

[30] Foreign Application Priority Data

Apr. 16, 1996 [FR] France .................................. 96 04739

[51] Int. Cl.⁶ ........................................................ G21C 3/07
[52] U.S. Cl. ........................... 376/457; 376/900; 420/422
[58] Field of Search ........................ 376/305, 457, 376/900; 420/422; 148/421, 672; 75/612, 621

[56] References Cited

U.S. PATENT DOCUMENTS 4,119,457 10/1978 Perfect ..................................... 420/580
4,363,658 12/1982 Shushlebin et al. .................... 420/422

FOREIGN PATENT DOCUMENTS 0 154 599 A2 9/1985 European Pat. Off. .

*Primary Examiner*—Daniel D. Wasil
*Attorney, Agent, or Firm*—Pollock, Vande Sande & Priddy

[57] ABSTRACT

The alloy has a base composition similar to that of a zirconium alloy of known type used for the manufacture of an element intended for use in the core of a nuclear reactor, such as a cladding tube, a guide tube, or another structural element of a fuel assembly. In addition, the alloy contains sulphur in a proportion by weight of between 8 and 100 ppm and preferably between 8 and 30 ppm.

15 Claims, 1 Drawing Sheet

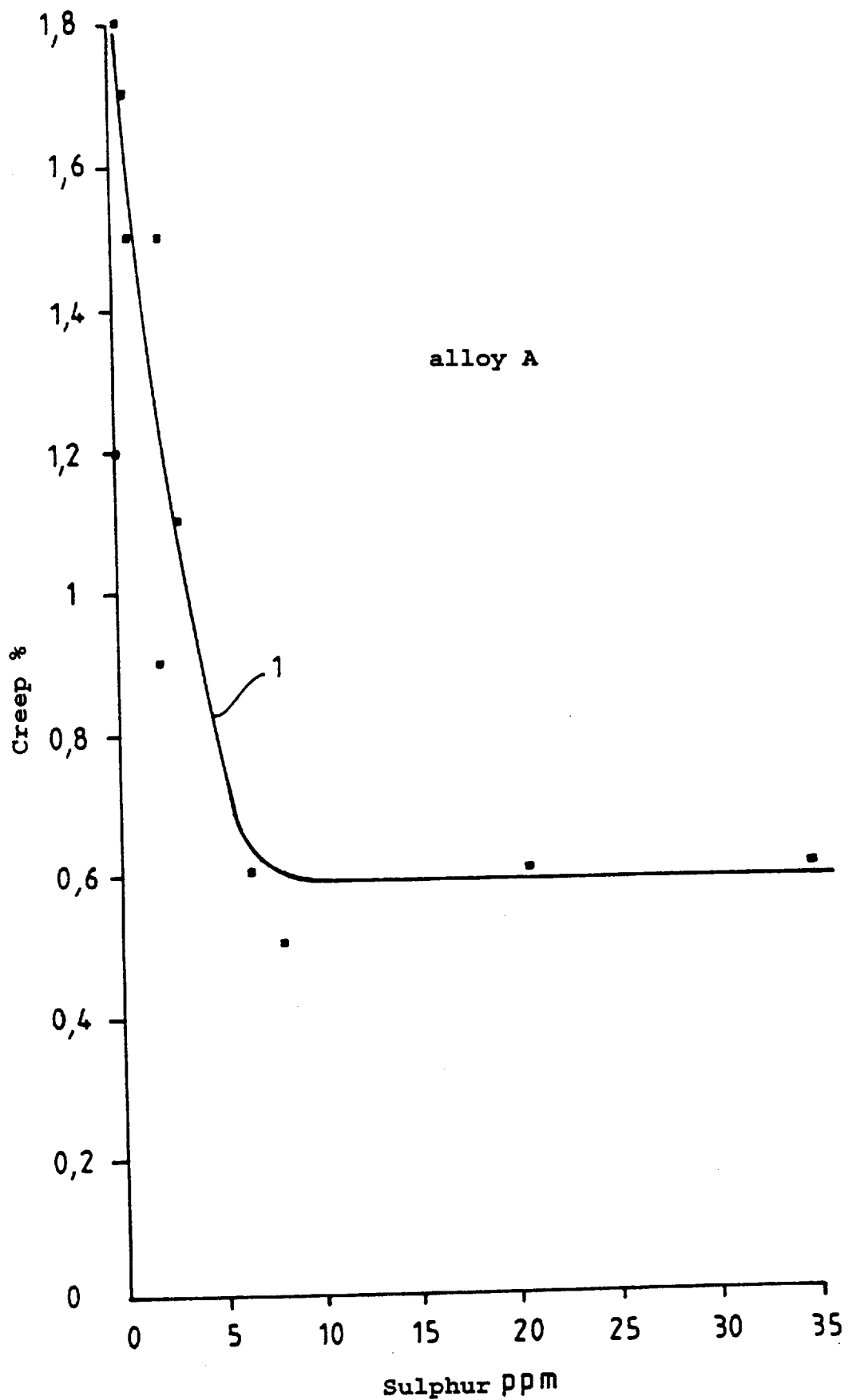

ZIRCONIUM-BASED ALLOY, MANUFACTURING PROCESS, AND USE IN A NUCLEAR REACTOR

FIELD OF THE INVENTION

The invention relates to a zirconium-based alloy for the manufacture of elements used in a nuclear reactor and to the elements produced from this alloy.

BACKGROUND OF THE INVENTION

Zirconium alloys are known materials for producing elements undergoing, in service, the conditions prevailing inside the core of a nuclear reactor. In particular, such zirconium-alloy elements are used in light-water-cooled nuclear reactors, such as pressurized-water reactors (PWR) and boiling-water reactors (BWR). The zirconium alloys are also used in heavy-water-cooled reactors, such as CANDU-type reactors. The zirconium alloys are used in particular in tube form in order to constitute guide tubes for fuel assemblies, fuel rod clads which are filled with pellets of fuel material, or absorber rod clads. These alloys are also used in the form of flat products, such as sheets or strips, in order to form structural elements for nuclear-reactor fuel assemblies.

In the case of heavy-water-cooled reactors, zirconium alloys are also used to form cans intended to contain fuel elements.

These zirconium alloys generally contain at least 96% by weight of zirconium. The main alloys used are Zircaloy 4 which contains, by weight, from 1.2 to 1.7% of tin, from 0.18 to 0.24% of iron and from 0.07 to 0.13% of chromium, Zircaloy 2 which contains, by weight, from 1.2 to 1.7% of tin, from 0.07 to 0.20% of iron, from 0.05 to 0.15% of nickel and from 0.05 to 0.15% of chromium, an alloy containing zirconium and 2.2 to 2.8% by weight of niobium, and an alloy containing zirconium and 0.7 to 1.3% by weight of niobium.

Other zirconium alloys used in nuclear reactors have the following compositions by weight (nominal compositions):

Zr, 1% Nb, 1% Sn, 0.1% Fe

Zr, 0.5% Nb, 0.65% Fe, 0.5% V

Zr, 1% Nb, 1.2% Sn, 0.45% Fe, 0.1% Cr

Zr, 0.5% Sn, 0.45% Fe, 0.1% Cr

Zr, 0.5% Sn, 0.46% Fe, 0.23% Cr, 0.03% Ni, 100 ppm Si.

These zirconium alloys may also contain a certain quantity of oxygen.

These alloys, which are used to produce elements arranged in service in the core of a nuclear reactor, must be weakly neutron-absorbing and have good mechanical properties, in particular at high temperature, and good resistance to corrosion in the nuclear-reactor environment, in order, for example, to limit the risk of cracking in the case of fuel rod clads.

Depending on the conditions existing in the core of the nuclear reactor, various forms of corrosion may develop on the zirconium-alloy elements in contact with water or with steam at high temperature.

In pressurized-water reactors (PWR), the zirconium-alloy elements are mainly subjected to uniform corrosion, while in boiling water reactors (BWR), they are mainly subjected to nodular-type corrosion.

The most commonly used zirconium alloys, for example the alloys mentioned above, have compositions and are subjected to heat treatments such that they can develop mechanical properties and resistance to the various forms of corrosion which are sufficient to permit their use in nuclear reactors. In general, the structures developed in the most commonly used zirconium alloys are indicated hereinbelow.

Zircaloy 2 and Zircaloy 4 are $\alpha$-phase alloys characterized by a precipitation of intermetallics in an $\alpha$-phase matrix.

Alloys containing niobium are $\alpha+\beta$ phase alloys which are characterized, inter alia, by a precipitation of $\beta$ phase in an $\alpha$-phase matrix.

For the purpose of improving the behavior of zirconium-alloy elements inside the core of nuclear reactors, and therefore of lengthening their useful life, it has mainly been sought to improve their resistance to the various forms of corrosion, by additions of alloying elements and by heat treatments enabling the structure of these alloys to be refined. The smelting, conversion and forming conditions of these alloys must be adapted to each type of alloy used. Consequently, the industrial processes for manufacturing the zirconium-alloy elements are rendered more complex and more expensive. Furthermore, the improvements achieved with regard to corrosion behavior are rarely accompanied by improvements with regard to creep resistance, which is another extremely important parameter influencing the behavior of the elements used in nuclear reactors.

Moreover, the known additions for improving the creep behaviour may lead to degradation of the corrosion behavior. For example, it is known that tin, which improves the creep behavior, degrades the uniform-corrosion behavior of the zirconium alloys.

SUMMARY OF THE INVENTION

The object of the invention is therefore to provide a zirconium-based alloy, for the manufacture of elements used in a nuclear reactor, which is resistant to creep and to corrosion by water and steam, while at the same time having a base composition similar to that of a conventional-type zirconium alloy which can be processed by known industrial processes, having markedly improved creep and corrosion resistance.

To this end, the alloy according to the invention contains sulfur in a proportion by weight of between 8 and 100 ppm (parts per million).

BRIEF DESCRIPTION OF THE DRAWINGS

In order to make the invention clearly understood, a description will now be given, by way of example, of a zirconium alloy according to the invention, the base composition of which, apart from sulfur, corresponds to the composition of a known alloy, and its creep-resistance and corrosion-resistance properties obtained by standardized-type tests.

The single FIGURE is a diagram representative of the creep behavior of a zirconium alloy as a function of its sulfur content.

DESCRIPTION OF PREFERRED EMBODIMENT

No specification exists regarding the sulfur content of known-type zirconium-based alloys used for the production of elements employed in the core of nuclear reactors, sulfur being regarded as an unavoidable impurity. Usually, this content is maintained at a value of less than 2 ppm, this small amount contributing to imparting conventional good ductility and stress-corrosion-resistance properties to the zirconium alloys.

Research by the Applicants has shown that, surprisingly, additions of sulfur in very small quantities, but greater than the usual contents in conventional-type technical-grade zirconium alloys, substantially improved the creep behavior of these alloys without degrading the corrosion behavior and even, in certain cases, that additions of sulfur could increase the resistance of the alloy to oxidation by water or steam.

A description will be given below of the creep tests, and then the corrosion tests, carried out on zirconium alloys having a controlled sulfur content.

Creep tests a—Definition of the tests

1—Creep tests were carried out on tubes subjected to high temperature and to internal pressure. The hoop strain in the tube after 240 hours at 400° C. under a hoop stress of 130 MPa was measured. These tests will hereafter be termed biaxial tests.

2—Tests were also carried out on test pieces, the elongation of which, due to creep after 240 hours at 400° C. under a stress of 110 MPa, was measured. These tests may hereafter be termed tests under uniaxial conditions.

b—Zirconium alloys subjected to the tests

1—First of all, the effect of sulphur addition on an alloy containing, apart from zirconium, 0.7 to 1.3% by weight of niobium and 0.09 to 0.16% by weight of oxygen (alloy A) was studied. Sulfur was added to this base composition so as to make stepped additions enabling tests to be carried out on alloys containing a sulfur content increasing from a virtually zero content up to a content of about 35 ppm.

The sulfur was added in the form of sulfur-containing zirconia having a controlled sulfur content of between 5,000 and 15,000 ppm of sulfur. The oxygen content of the alloys was controlled by complementary additions of substantially sulfur-free zirconia. The additions of sulfur-containing zirconia and of sulfur-free zirconia, in order to adjust the sulphur and oxygen content of the alloy to very precise values, are carried out in an initial smelting phase, at the time of making up the charge which is then melted.

The zirconium-alloy tubes were manufactured according to a conventional sequence of operations, which includes:

forging of an ingot in the β phase;

quenching of the billets obtained from the β phase;

drawing in the α+β phase;

four to five rolling cycles followed by annealing operations, the annealing operations being carried out between 580° and 700° C.

2—Zirconium alloys containing, by weight, 0.3 to 1.4% of tin, 0.4 to 1% of iron, 0.2 to 0.7% of vanadium or of chromium, between 500 and 1800 ppm of oxygen and variable sulfur contents increasing from a virtually zero content were also smelted. This alloy (alloy B) was made in the form of tubular test pieces in the recrystallized state for biaxial creep tests, using the conventional conversion process.

3—Alloys of the Zircaloy 4 type containing, by weight, from 1.2 to 1.7% of tin, from 0.18 to 0.25% of iron and from 0.07 to 0.13% of chromium, as well as sulfur contents increasing from a virtually zero content, were also smelted. These alloys are made in the form of tubular test pieces in the relieved state for biaxial creep tests.

4—Creep test pieces for uniaxial creep tests were also produced from Zircaloy 4 having undergone a recrystallization treatment.

The smelted alloys may also contain a certain quantity of oxygen.

c—Creep test results.

With regard to the biaxial creep tests on alloys A described in Paragraph 1 above, reference will be made to the appended figure which is a diagram giving the hoop strain, in %, in the tubes as a function of the sulfur content in ppm. The hoop strain is the strain measured after the tubes have been maintained for 240 hours at 400° C. under a hoop stress of 130 MPa.

It may be seen that a few ppm of sulfur, above the usual limits, improves the creep behavior by a factor of from 2 to 3. For example, the creep resistance is virtually doubled in respect of a sulfur content going from 2 to 5 ppm and tripled in respect of a sulfur content going from 1 to 10 ppm.

Furthermore, above about 8 ppm, curve 1 showing the creep resistance as a function of the sulfur content exhibits a horizontal plateau, which manifests the saturation of the improvement in the creep behaviour by addition of sulfur.

With regard to alloys B containing tin, iron and vanadium, which are described in Paragraph 2 above, the hoop elongation in biaxial creep of the test pieces goes from 2.3% to 1.2% when the sulphur content goes from 2 to 14 ppm (a result obtained on an alloy containing 0.5% Sn, 0.6% Fe and 0.4% V).

With regard to relieved Zircaloy 4 (Paragraph 3 above), the hoop elongation in biaxial creep goes from 1.8 to 1.6% when the sulfur goes from 2 to 9 ppm (a result obtained on Zircaloy 4 containing 1.3% Sn, 0.20% Fe and 0.11% Cr).

The uniaxial creep tests on the recrystallized Zircaloy 4 test pieces showed that the elongation due to creep goes from 4 to 2.2% for sulfur contents going from 2 to 18 ppm, respectively, (a result obtained on Zircaloy 4 containing 1.3% Sn, 0.20% Fe and 0.11% Cr).

The creep tests have therefore shown that sulfur, at contents which are low but greater than the usual contents in known technical-grade zirconium alloys, significantly reinforces the zirconium matrix. This effect has been observed both with regard to alloys in the a phase as well as alloys in the α+β phase.

Corrosion tests a—Tests carried out on the alloys used for the creep tests.

A corrosion test was carried out by subjecting the alloys used for the creep tests to steam at a temperature of 400° C. for a period of 3 days. The weight gain of the specimens at the end of the test is measured. The test, corresponding to the ASTM G II standardized test, showed that the alloys exhibit corrosion behavior which is at least as good as that of conventional-type alloys containing sulfur only by way of a residual element at less than 2 ppm. It has therefore been proven that sulfur does not have a harmful effect on the uniform-corrosion behavior of zirconium alloys of the type observed in pressurized-water reactors.

b—Nodular-type and uniform-type corrosion tests on zirconium alloys containing up to 100 ppm of sulphur.

Corrosion tests were carried out on zirconium alloys of Zircaloy 4 type, of the Zircaloy 2 type, on an alloy containing, by weight, 0.7 to 1.3% of niobium, 0.8 to 1.5% of tin, 0.1 to 0.6% of iron, 0.01 to 0.2% of chromium and from 500 to 1800 ppm of oxygen, and on a complex alloy containing, by weight, 0.7 to 1.25% of tin, 0.1 to 0.3% of iron, 0.05 to 0.2% of chromium, 0.1 to 0.3% of niobium, 0.01 to 0.02% of nickel and from 500 to 1800 ppm of oxygen to which sulfur was added so that the content of the alloy is between 0 and 100 ppm.

The additions of sulfur were carried out either in the form of iron sulfide or of tin sulfide, in button-shaped specimens having a mass of 150 g which are produced from various grades given hereinbelow.

In all cases, the sulfur yield of the addition operation, i.e., the ratio between the sulfur introduced into the charge of raw materials and the sulfur analyzed after melting was close to 100%. The sulfur contents of the various specimens used are therefore known very precisely.

The zirconium-alloy buttons containing sulfur were converted into flat products, such as sheets or strips, according to a conventional sequence of production operations, comprising:

quenching from the β phase;
hot rolling between 650° and 750° C.;
two cycles of cold rolling, followed by annealing.

The corrosion tests carried out are the following:

1.—In order to measure the nodular-corrosion resistance, as observed in boiling-water reactors, the specimens are maintained under a stress of 10.3 MPa for 24 hours at 500° C. in contact with steam.

2.—In order to measure the uniform-corrosion resistance, as encountered in pressurized-water reactors, the specimens are maintained under a stress of 10.3 MPa for variable times, at 400° C., in contact with steam.

The results of the tests are as follows:

With regard to Zircaloy 2, the 1% niobium alloy and the vanadium-containing alloy, no significant effect of the sulfur additions up to 100 ppm either on the nodular corrosion behavior or on the uniform-corrosion behavior was detected.

On the other hand, as is apparent in particular from Table 1 given below, relating to Zircaloy 4 specimens to which sulfur has been added in variable proportions in the form of tin sulfide SnS, sulfur may be seen to have a beneficial effect. This effect is particularly remarkable in the case in which the sequence of treatment operations on the alloy is not optimized, so that the alloy is resistant simultaneously to the two forms, nodular and uniform, of corrosion.

In Table 1, the heat treatment parameter ΣA is defined by the formula:

$$\Sigma A = t.\exp(-40000/T)$$

where t is the treatment time in hours and T is the treatment temperature in kelvin.

TABLE 1

| Sulfur content in ppm | Gain in mass, in mg/dm² 1.5 mm sheet annealed for 2 h 40 min at 650° C. $\Sigma A = 4.8 \times 10^{-18}$ | |
| --- | --- | --- |
| | 24 h at 500° C. | 260 d at 400° C. |
| 3 | 400 | 226 |
| 22 | 180 | 244 |
| 38 | 110 | 173 |
| 69 | 140 | 178 |
| 80 | 78 | 173 |

In fact, Zircaloy 4 exhibits good resistance to nodular corrosion in the case of sequences of treatment operations resulting in a $\Sigma A < 10^{-19}$ and exhibits good resistance to uniform corrosion in respect of $\Sigma A > 10^{-17}$. It is also known that intermediate ΣA values sometimes lead to highly random behavior with regard to one or other of the forms of corrosion.

In the case of the corrosion tests, the results of which are given in Table 1, test pieces made of 1.5 mm thick sheet annealed for 2 hours 40 minutes at 650° C. were used; the ΣA is $4.8 \times 10^{-18}$.

The 24-hour 500° C. nodular corrosion tests correspond to the case of a boiling-water reactor and the 260-day 400° C. uniform corrosion tests correspond to the conditions of a pressurized-water reactor.

For the sulfur contents of 3, 22, 38, 69 and 80 ppm, in practice declining gains in mass, in mg/dm², of the test piece are observed in both cases.

Furthermore, Table 1 shows that sulfur, by improving simultaneously the resistance to both forms of corrosion, helps in the compromise between good uniform-corrosion behavior and good nodular-corrosion behavior of the alloys.

c—Corrosion tests on Zircaloy 4 alloys containing more than 100 ppm of sulfur.

1—Preparation of Zircaloy 4 specimens.

Six grades of Zircaloy 4 having a sulfur content varying from a little less than 10 ppm to 310 ppm were smelted and their composition is indicated in Table 2 below.

TABLE 2

| Grade ref. | Sn % | Fe ppm | Cr ppm | Si ppm | S ppm |
| --- | --- | --- | --- | --- | --- |
| 1 (control) | 1.56 | 2216 | 974 | 15 | <10 |
| 2 | 1.42 | 2088 | 954 | 13 | 15 |
| 3 | 1.53 | 2336 | 1098 | 17 | 35 |
| 4 | 1.50 | 2383 | 896 | 15 | 97 |
| 5 | 1.43 | 2228 | 1007 | 12 | 102 |
| 6 | 1.42 | 2098 | 987 | 15 | 310 |

Six 150 g buttons were prepared after three successive arc meltings under argon of the following raw materials: pure iron, pure chromium, zirconium chips, SnFeCr alloy with addition of sulfur in the form of iron sulfur for the grades having the reference numbers 2, 3, 4, 5 and 6 in Table 2.

The buttons were converted into sheet using a conventional sequence of conversion operations, comprising:

preheating at 1050° C. for 10 minutes followed by a water quench,
rolling at 760° C. down to a thickness of 7 mm;
descaling and pickling;
cold rolling in order to size to 6 mm;
vacuum annealing at 650° C. for two hours;
pickling;
cold rolling down to a thickness of 3 mm.

At least one coupon per grade, i.e., at least six coupons, were removed, by cutting, for each grade of sheet work-hardened by the cold rolling, in order to carry out uniform-corrosion tests (test A) lasting 140 days. Five coupons are referenced in the table of results (Table 3) by the reference numbers (1A, 2A, 3A, 4A and 5A).

TABLE 3

| | Corrosion tests in steam at 400° C. | | | | |
| --- | --- | --- | --- | --- | --- |
| Reference No. | Sulfur content ppm | Sheet thickness in mm | Metallurgical state | Test duration in days | Weight gain in mg/dm² |
| 1A | <10 | 3 | Work-hardened | 140 | 186 |
| 2A | 15 | " | Work-hardened | " | 160 |
| 3A | 35 | " | Work-hardened | " | 131 |
| 4A | 97 | " | Work-hardened | " | 125 |
| 5A | 102 | " | Work- | " | 117 |

TABLE 3-continued

Corrosion tests in steam at 400° C.

| Reference No. | Sulfur content ppm | Sheet thickness in mm | Metallurgical state | Test duration in days | Weight gain in mg/dm² |
|---|---|---|---|---|---|
| 1B | <10 | 1.5 | Work-hardened | 85 | 375 |
| 2B | 15 | " | Work-hardened | " | 567 |
| 3B | 35 | " | Work-hardened | " | 93 |
| 4B | 97 | " | Work-hardened | " | 84 |
| 5B | 102 | " | Work-hardened | " | 79 |
| 1C | <10 | 1.5 | Restored | 85 | 315 |
| 2C | 15 | " | " | " | 189 |
| 3C | 35 | " | " | " | 89 |
| 4C | 97 | " | " | " | 75 |
| 5C | 102 | " | " | " | 69 |

The sequence of treatment operations on the sheets is continued by the following operations:
vacuum annealing at 650° C. for two hours of a 3 mm sheet followed by pickling;
cold rolling down to 1.5 mm.

At least one coupon, i.e., in total at least six coupons, are removed from each grade of sheet work-hardened by the cold rolling in order to carry out a uniform-corrosion test (test B) of 85-hour duration.

Five coupons are referenced by the reference numbers 1B, 2B, 3B, 4B and 5B in Table 3.

The treatment cycle is continued by the following treatment:
vacuum annealing at 500° C. for two hours.

Six coupons for the uniform-corrosion test (test C) of 85-hour duration are removed from each grade of sheet thus restored by vacuum annealing.

Five coupons are referenced 1C, 2C, 3C, 4C and 5C in Table 3.

Finally, the remaining sheet parts are subjected to recrystallization annealing at 650° C. under vacuum for 2 hours.

A nodular-corrosion test D is carried out on the remaining sheet parts.

Four coupons removed for this test are referenced 1D, 2D, 3D and 4D.

The results of the tests are indicated in Tables 3 and 4.

TABLE 4

24-hour corrosion tests in steam at 500° C.

| Reference No. | Sulfur content ppm | Sheet thickness in mm | Metallurgical state | Weight gain in mg/dm² |
|---|---|---|---|---|
| 1D | <10 | 1.5 | Recrystallized | 425 |
| 2D | 15 | " | " | 510 |
| 3D | 35 | " | " | 270 |
| 4D | 97 | " | " | 156 |

In all cases, the weight gain of the specimen in mg/dm² is measured.

A simultaneous improvement in the uniform-corrosion resistance and in the nodular-corrosion resistance of the specimens whose sulphur content increases from a value of less than 10 ppm up to a value of about 100 ppm is observed. In the region of the value of 100 ppm of sulphur, there is saturation of the improvement effect in the uniform-corrosion or the nodular-corrosion behaviour, and then, above 100 ppm of sulfur, up to a maximum value of 310 ppm there is a variable decrease, present in all the specimens, in the uniform-corrosion and nodular-corrosion behavior. The values of the mass gains of the specimens for sulfur contents of 310 ppm have not been given in the tables. In certain cases, the corrosion resistance decreases back to a level close to the initial level.

Furthermore, the effect of the sulphur content on the improvement in the corrosion behavior becomes significant in the region of a sulfur content approximately equal to 30 ppm.

In order to define the alloys according to the invention, which have a base composition similar to that of a known technical-grade zirconium alloy and which have, in addition, a sulfur content, by weight, of between 8 and 100 ppm, the elements indicated hereinbelow have been taken into account.

The sulphur content must be fixed at the lowest value making it possible to obtain both optimum improvement in the creep behavior and in the uniform-corrosion and nodular-corrosion behavior at least equal to that of the known technical-grade alloy having the base composition of the alloy according to the invention. A value of 8 ppm was therefore chosen, which corresponds to the value at which the beneficial effect on the creep behavior of the zirconium alloys saturates, this 8 ppm value being, moreover, high enough to be accurately assayed.

The 100 ppm range was chosen as the maximum value insofar as this value corresponds to the value of the sulfur content for which the increase in corrosion resistance saturates. Furthermore, it has been confirmed that the ductility and stress-corrosion properties of the zirconium alloys remain satisfactory for sulfur contents of less than 100 ppm.

However, insofar as an important effect is already obtained in respect of the corrosion behaviour in the region of 30 ppm, a preferred range for the sulfur content will be between 8 and 30 ppm. In this way, any undesirable effect of the sulfur on the mechanical and formability properties of the zirconium alloy is limited.

The invention encompasses zirconium alloys of compositions other than those which have been described, for example the base compositions, given in the explanation of the prior art, containing at least 96% of zirconium and, from 8 to 100 ppm of sulfur.

In particular, the invention applies to a zirconium alloy containing, by weight, from 0.3 to 0.7% of tin, from 0.3 to 0.7% of iron, from 0.1 to 0.4% of chromium, from 0.01 to 0.04% of nickel, from 70 to 120 ppm of silicon and from 500 to 1800 ppm of oxygen.

An example of such an alloy is the alloy containing 0.5% of tin, 0.46% of iron, 0.23% of chromium, 0.003% of nickel and 100 ppm of silicon, mentioned above.

In general, the zirconium alloys according to the invention may include, in addition to the alloying elements mentioned, other alloying elements, in particular a certain amount of oxygen.

We claim:

1. A zirconium-based alloy for the manufacture of elements used in a nuclear reactor, said alloy being resistant to creep and to corrosion by water and steam, and containing at least 96% by weight of zirconium as well as sulfur in a proportion by weight of 8 to 100 ppm (parts per million).

2. The alloy according to claim 1, containing sulfur in a proportion by weight of 8 to 30 ppm.

3. The alloy according to claim 2, containing, in addition to zirconium and sulfur, 1.2 to 1.7% by weight of tin, 0.18 to 0.25% by weight of iron, 0.05 to 0.15% of nickel, and 0.05 to 0.15% of chromium, as well as optionally a certain proportion by weight of oxygen.

4. The alloy according to claim 2, containing, in addition to zirconium and sulfur, 1.2 to 1.7% by weight of tin, from 0.07 to 0.20% of iron, from 0.05 to 0.15% of nickel and from 0.05 to 0.15% of chromium as well as optionally a certain proportion by weight of oxygen.

5. The alloy according to claim 2, containing, in addition to zirconium and sulfur, 0.7 to 1.3% by weight of niobium and 900 to 1600 ppm by weight of oxygen.

6. The alloy according to claim 2, containing, in addition to zirconium and sulfur, 0.3 to 1.4% by weight of tin, 0.4 to 1% by weight of iron, 0.2 to 0.7% by weight of vanadium or of chromium and between 500 and 1800 ppm of oxygen.

7. The alloy according to claim 2, containing, in addition to zirconium and sulfur, 0.7 to 1.3% by weight of niobium, 0.8 to 1.5% by weight of tin, 0.1 to 0.6% by weight of iron, 0.01 to 0.2% by weight of chromium and from 500 to 1800 ppm of oxygen.

8. The alloy according to claim 2, containing, in addition to zirconium and sulfur, about 0.7 to 1.25% by weight of tin, 0.1 to 0.3% by weight of iron, 0.05 to 0.2% by weight of chromium, 0.1 to 0.3% by weight of niobium, 0.01 to 0.02% by weight of nickel and from 500 to 1800 ppm of oxygen.

9. The alloy according to claim 2, containing 2.2 to 2.8% by weight of niobium.

10. The alloy according to claim 2, containing, by weight, from 0.3 to 0.7% of tin, from 0.3 to 0.7% of iron, from 0.1 to 0.4% of chromium, from 0.01 to 0.04% of nickel, from 70 to 120 ppm of silicon and from 500 to 1800 ppm of oxygen.

11. A cladding tube of a fuel rod for a nuclear reactor made of an alloy according to any one of claims 1 to 10.

12. A structural element for a fuel assembly and, in particular, of a guide tube of a fuel assembly for a nuclear reactor made of an alloy according to any one of claims 1 to 10.

13. A can intended to contain a bundle of fuel elements of a nuclear reactor made of an alloy according to any one of claims 1 to 10.

14. A process for elaborating a zirconium-based alloy containing at least 96% by weight of zirconium and sulfur in a proportion by weight of between 8 and 100 ppm, said process comprising the steps of (a) making up a charge having a base composition of said alloy;

(b) adding sulfur containing zirconia and optionally sulfur-free zirconia to the charge; and (c) melting said charge.

15. A process for elaborating a zirconium-based alloy containing at least 96% by weight of zirconium and sulfur in a proportion by weight of between 8 and 100 ppm, said process comprising the steps of (a) making up a charge having a base composition of said alloy;

(b) adding to said charge at least one of tin sulfide and iron sulfide; and (c) melting the charge.

* * * * *